United States Patent
Chen et al.

(10) Patent No.: US 11,776,573 B2
(45) Date of Patent: Oct. 3, 2023

(54) MAGNETIC DISK DEVICE AND METHOD FOR MEASURING COUNTER ELECTROMOTIVE VOLTAGE OF SPINDLE MOTOR

(71) Applicants: Kabushiki Kaisha Toshiba, Tokyo (JP); Toshiba Electronic Devices & Storage Corporation, Tokyo (JP)

(72) Inventors: Yu Chen, Sagamihara Kanagawa (JP); Kenichiro Ozeki, Yokohama Kanagawa (JP); Koichiro Miyamoto, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/197,158

(22) Filed: Mar. 10, 2021

(65) Prior Publication Data

US 2021/0383833 A1    Dec. 9, 2021

(30) Foreign Application Priority Data

Jun. 5, 2020    (JP) ................................ 2020-098394

(51) Int. Cl.
    *G11B 19/20*    (2006.01)
    *G11B 19/28*    (2006.01)
(52) U.S. Cl.
    CPC .......... *G11B 19/2054* (2013.01); *G11B 19/28* (2013.01)

(58) Field of Classification Search
    CPC ........................... G11B 19/2054; G11B 19/28
    See application file for complete search history.

(56) References Cited

U.S. PATENT DOCUMENTS

| 5,276,569 A | 1/1994 | Even |  |
| --- | --- | --- | --- |
| 6,414,812 B1 | 7/2002 | Hattori |  |
| 7,042,668 B1 | 5/2006 | Emo |  |
| 8,278,910 B2 * | 10/2012 | Machida | H03L 7/0805 |
|  |  |  | 324/166 |
| 9,171,568 B1 * | 10/2015 | Nicholls | G11B 19/28 |
| 2004/0136110 A1 * | 7/2004 | Kohso | G11B 5/5526 |
|  |  |  | 360/78.06 |
| 2004/0263113 A1 * | 12/2004 | Kim | H02P 6/182 |
|  |  |  | 318/802 |
| 2006/0125439 A1 * | 6/2006 | Ajima | B60L 50/16 |
|  |  |  | 318/716 |
| 2009/0049463 A1 * | 2/2009 | Ueda | H02P 6/28 |
|  |  |  | 720/695 |
| 2011/0285333 A1 * | 11/2011 | Kobayashi | H02P 23/14 |
|  |  |  | 318/400.14 |

(Continued)

FOREIGN PATENT DOCUMENTS

JP    2005-176434 A  *  6/2005

*Primary Examiner* — Andrew L Sniezek
(74) *Attorney, Agent, or Firm* — Allen & Overy LLP

(57) ABSTRACT

According to an embodiment, a magnetic disk device includes a magnetic disk, a spindle motor that rotates the magnetic disk, a motor driver, and a controller. The motor driver supplies a motor current to the spindle motor and measures a counter electromotive voltage of the spindle motor every time the spindle motor makes one rotation. After the rotation of the magnetic disk starts, the controller adjusts a motor position where the counter electromotive voltage is measured to a set first position.

13 Claims, 10 Drawing Sheets

(56) References Cited

U.S. PATENT DOCUMENTS

| | | | |
|---|---|---|---|
| 2012/0075742 A1* | 3/2012 | Takakura | G11B 5/5547 |
| | | | 360/75 |
| 2016/0156295 A1* | 6/2016 | Kaidu | H02P 6/182 |
| | | | 318/400.11 |
| 2017/0077850 A1* | 3/2017 | Hamada | H02P 21/24 |
| 2018/0358911 A1* | 12/2018 | Kojima | H02P 6/20 |
| 2020/0007056 A1* | 1/2020 | Park | H02P 6/10 |
| 2020/0106375 A1* | 4/2020 | Miura | H02P 6/18 |
| 2021/0273589 A1* | 9/2021 | Ishiji | H02M 7/53873 |

* cited by examiner

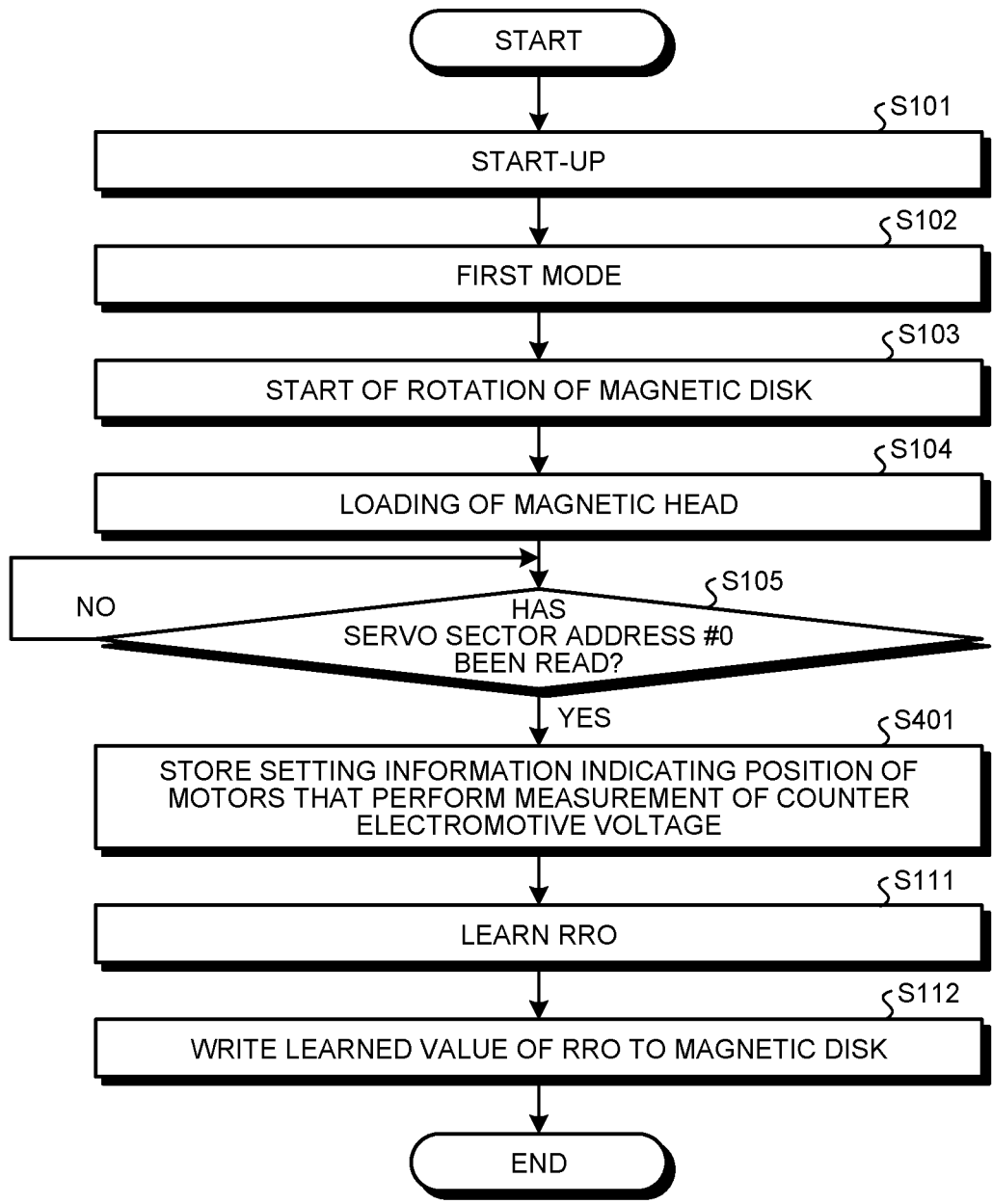

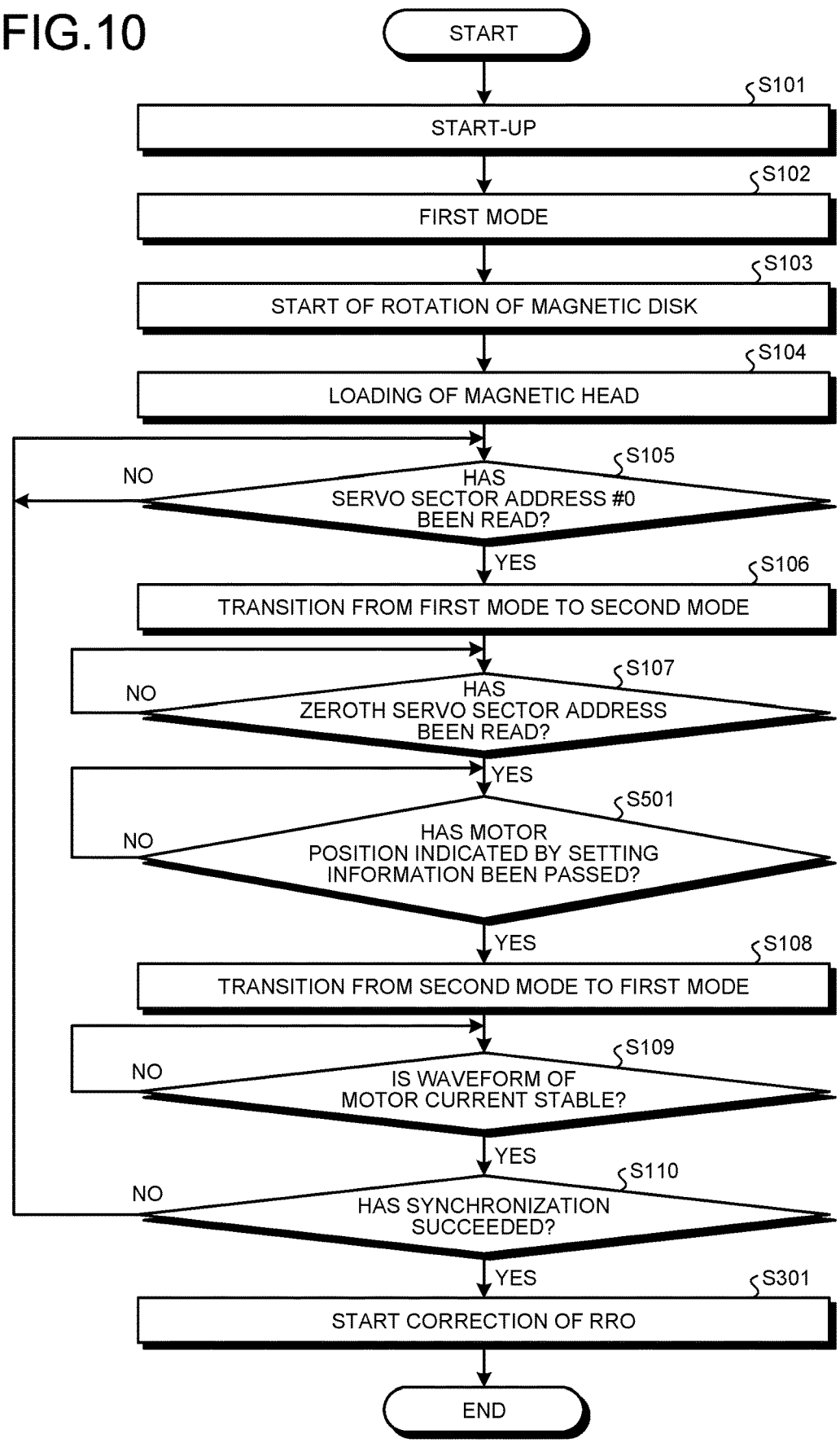

MAGNETIC DISK DEVICE AND METHOD FOR MEASURING COUNTER ELECTROMOTIVE VOLTAGE OF SPINDLE MOTOR

CROSS-REFERENCE TO RELATED APPLICATIONS

This application is based upon and claims the benefit of priority from Japanese Patent Application No. 2020-098394, filed on Jun. 5, 2020; the entire contents of which are incorporated herein by reference.

FIELD

Embodiments described herein relate generally to a magnetic disk device and a method.

BACKGROUND

Conventionally, repeatable run-out (RRO) is known as one component of a positioning error of a magnetic head in a magnetic disk device. RRO is a positional deviation between a track trajectory defined by a burst pattern and an actual track trajectory. RRO fluctuates in synchronization with the rotation of the magnetic disk (and a spindle motor).

RRO is learned in a manufacturing process of the magnetic disk device. When the magnetic disk device is used, a position of the magnetic head is corrected using a learned value of RRO.

BRIEF DESCRIPTION OF THE DRAWINGS

FIG. 9 is a flowchart illustrating an example of an operation of a magnetic disk device according to a second embodiment at the time of learning RRO; and FIG. 10 is a flowchart illustrating an example of the operation of the magnetic disk device when a user uses the magnetic disk device according to the second embodiment.

DETAILED DESCRIPTION

According to the present embodiments, a magnetic disk device includes a magnetic disk, a spindle motor that rotates the magnetic disk, a motor driver, and a controller. The motor driver supplies a motor current to the spindle motor and measures a counter electromotive voltage of the spindle motor every time the spindle motor makes one rotation. After the rotation of the magnetic disk starts, the controller adjusts a motor position where the counter electromotive voltage is measured to a set first position.

Hereinafter, the magnetic disk device and a method according co embodiments will be described in detail with reference to the attached drawings. Note that the present invention is not limited to these embodiments.

First Embodiment

Figure 1:
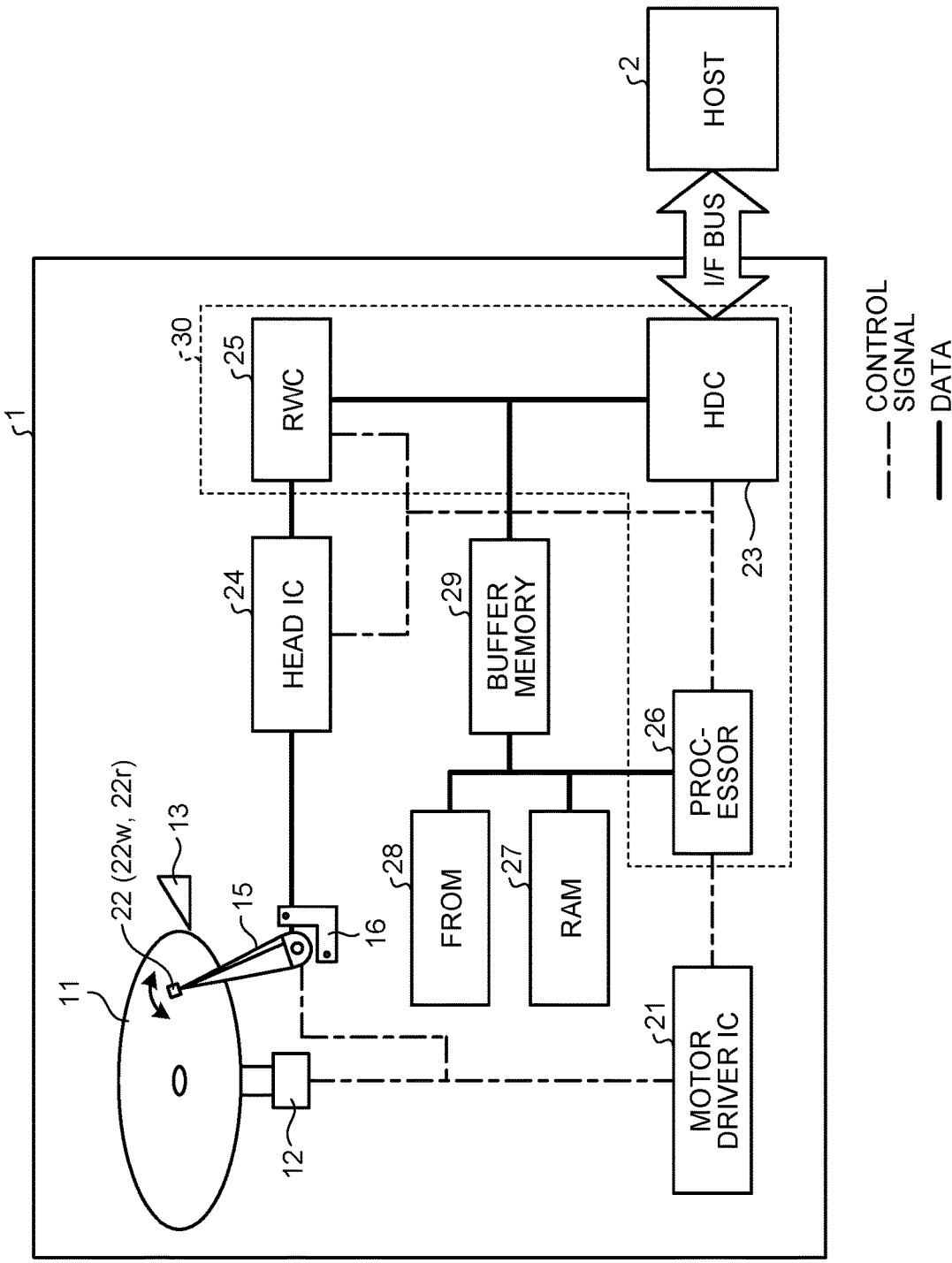
FIG. 1 as a schematic diagram illustrating an example of a configuration of a magnetic disk device of a first embodiment.

FIG. 1 is a schematic diagram illustrating an example of a configuration of a magnetic disk device 1 of a first embodiment.

The magnetic disk device 1 is connected to a host 2. The magnetic disk device 1 can receive access commands such as write commands and read commands from the host 2.

The magnetic disk device 1 includes a magnetic disk 11 having a magnetic layer formed on its surface. The magnetic disk device 1 writes data to the magnetic disk 11 or reads data from the magnetic disk 11 in response to an access command.

The write and read of data are performed via a magnetic head 22. Specifically, the magnetic disk device 1 includes a spindle motor 12, a motor driver integrated circuit (IC) 21, a magnetic head 22, an actuator arm 15, a voice coil motor (VCM) 16, a ramp 13, a head IC 24, a read/write channel (RWC) 25, a RAM 27, a flash read only memory (FROM) 28, a buffer memory 29, a hard disk controller (HDC) 23, and a processor 26, in addition to the magnetic disk 11.

The magnetic disk 11 is rotated at a predetermined rotational speed by the coaxially mounted spindle motor 12. The spindle motor 12 is driven by the motor driver IC 21.

The motor driver IC 21 controls the rotation of the spindle motor 12 and the rotation of the VCM 16. In particular, the motor driver IC 21 measures a counter electromotive voltage generated in the spindle motor 12 at least once for each rotation of the spindle motor 12, and acquires a current rotational speed of the spindle motor 12 based on a measured value of the counter electromotive voltage. Further, the motor driver IC 21 executes the speed control of the spindle motor 12 based on the acquired current rotational speed. Note that the motor driver IC 21 is an example of the motor driver.

The magnetic head 22 writes and reads data to and from the magnetic disk 11 by a write element 22w and a read element 22r provided therein. In addition, the magnetic head 22 is attached to a distal end of the actuator arm 15. The magnetic head 22 is moved along the radial direction of the magnetic disk 11 by the VCM 16 driven by the motor driver IC 21.

When the rotation of the magnetic disk 11 is stopped or the like, the magnetic head 22 is moved onto the ramp 13. The ramp 13 is configured to hold the magnetic head 22 at a position separated from the magnetic disk 11.

During the read, the head IC 24 amplifies and outputs a signal read from the magnetic disk 11 by the magnetic head 22 and supplies the signal to the RWC 25. In addition, the head IC 24 amplifies a signal corresponding to write target data supplied from the RWC 25 and supplies the amplified signal to the magnetic head 22.

The HDC 23 performs control of data transmission and reception performed with the host 2 via an I/F bus, control of the buffer memory 29, error correction processing of read data, and the like.

The buffer memory 29 is used as a buffer of data to be transmitted to and received from the host 2. For example, the buffer memory 29 is used to temporarily store the data written to the magnetic disk 11 or the data read from the magnetic disk 11.

The buffer memory 29 is configured using, for example, a volatile memory that can operate at high speed. A type of the memory constituting the buffer memory 29 is not limited to a specific type. For example, the buffer memory 29 can be configured using a dynamic random access memory (DRAM), a static random access memory (SRAM), or a combination thereof.

The RWC 25 modulates write target data to be supplied from the HDC 23 and supplies the modulated data to the head IC 24. In addition, the RNC 25 demodulates a signal read from the magnetic disk 11 and supplied from the head IC 24 and outputs the demodulated signal as digital data to the HDC 23.

The processor 26 is, for example, a central processing unit (CPU). The RAM 27, the flash read only memory (FROM) 26, and the buffer memory 29 are connected to the processor 26.

The FROM 28 is a nonvolatile memory. Firmware (program data) and various operation parameters are stored in the FROM 28. Note that the firmware may be stored on the magnetic disk 11.

The RAM 27 is configured using, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the magnetic disk device 1 according to the firmware stored in the FROM 28 or the magnetic disk 11. For example, the processor 26 loads the firmware from the FROM 28 or the magnetic disk 11 into the RAM 27, and executes control of the motor driver IC 21, the head. IC 24, the RNC 25, the HDC 23, and the like according to the loaded firmware.

Note that the configuration including the RMC 25, the processor 26, and the HDC 23 can also be regarded as the controller 30. In addition to these, the controller 30 may include any other elements (for example, the RAM 27, the FROM 28, the buffer memory 29, the RUC 25, or the like).

Figure 2:
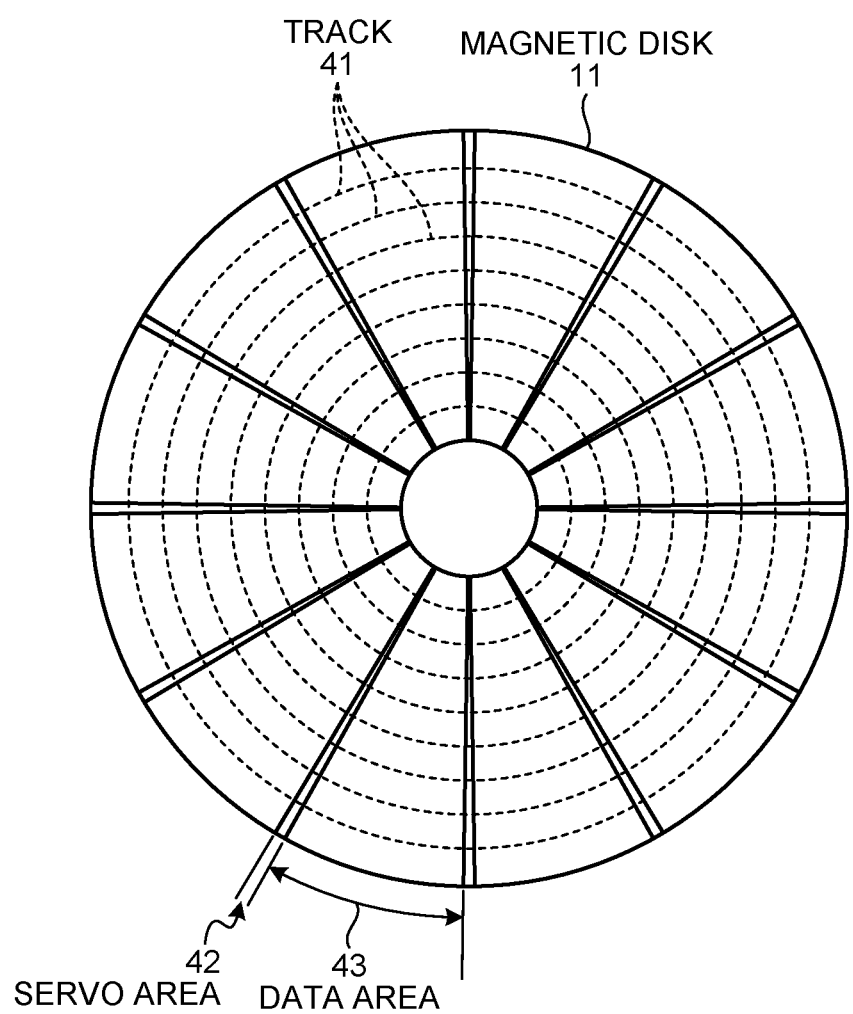
FIG. 2 is a schematic view illustrating an example of a configuration of a magnetic disk of the first embodiment.

FIG. 2 is a schematic view illustrating an example of a configuration of the magnetic disk 11 of the first embodiment.

Servo information is written to the magnetic disk 11 in the manufacturing process, for example, by a servo writer or self-servo write (SSW). FIG. 2 illustrates servo areas 42 arranged radially as an example of the arrangement of servo areas in which the servo information is written.

The servo information includes sector/cylinder information, a burst pattern, a post code, and the like. The sector/cylinder information can give a servo sector address which is a servo address an the circumferential direction and a track address which is a servo address in the radial direction of the magnetic disk 11. During the operation of the magnetic disk device 1, the sector/cylinder information is used for seek control to move the magnetic head 22 to a target track.

The burst pattern defines positions of each of a plurality of tracks. More specifically, the burst pattern defines a trajectory of each track. Here, there is a case where a track trajectory defined by the burst pattern deviates from an actual track trajectory due to a write error of servo information or the like. This positional deviation occurs repeatedly in the same manner with one rotation of the magnetic disk (and the spindle motor) as a cycle, and thus, is called RRO. In the manufacturing process, RRO is learned for each track, and the learned value of RRO is written to the magnetic disk 11 as the post code. Further, when the magnetic disk device 1 is used, control to cancel the positional deviation caused by RRO based on the post code is executed at the time of positioning the magnetic head 22 on the target track.

Note that a plurality of concentric tracks 41 are set according to the burst pattern and the post code according to FIG. 2. A data area 43 in which data can be written is provided between the servo areas 42 on the circumference of each of the tracks 41. In the data area 43, a plurality of data sectors are continuously formed. The magnetic head 22 writes and reads data to and from each data sector.

As described above, the motor driver IC 21 measures a counter electromotive voltage of the spindle motor 12 in order to obtain the current rotational speed of the spindle motor 12. The motor driver IC 21 measures the counter electromotive voltage at least once during a period in which the spindle motor 12 makes one rotation in order to obtain the current rotational speed at least once during a period in which the spindle motor 12 makes one rotation.

The counter electromotive voltage is measured at a timing when a value of a current supplied to the spindle motor 12 (hereinafter referred to as a motor current) crosses zero. The motor current crosses zero as the spindle motor 12 (more precisely, a rotor of the spindle motor 12) passes a specific motor position. That is, every time the spindle motor 12 makes one rotation, a value of the motor current crosses zero at the same motor position each time. Note that the motor position can be rephrased as an angle of the rotor. More specifically, the motor position is a relative angle between the rotor and the stator. It as assumed that the motor position takes a value in the range of 0 to 2n radians. In addition, the expression that the value of the motor current crosses zero means that the motor current transitions from a positive value to a negative value or transitions from a negative value to a positive value.

The value of the motor current crosses zero a plurality of times during the period in which the spindle motor 12 makes one rotation. Further, the number of times the value of the motor current crosses zero within the period in which the spindle motor 12 makes one rotation increases according to the number of magnetic poles of the spindle motor 12.

Figure 3:
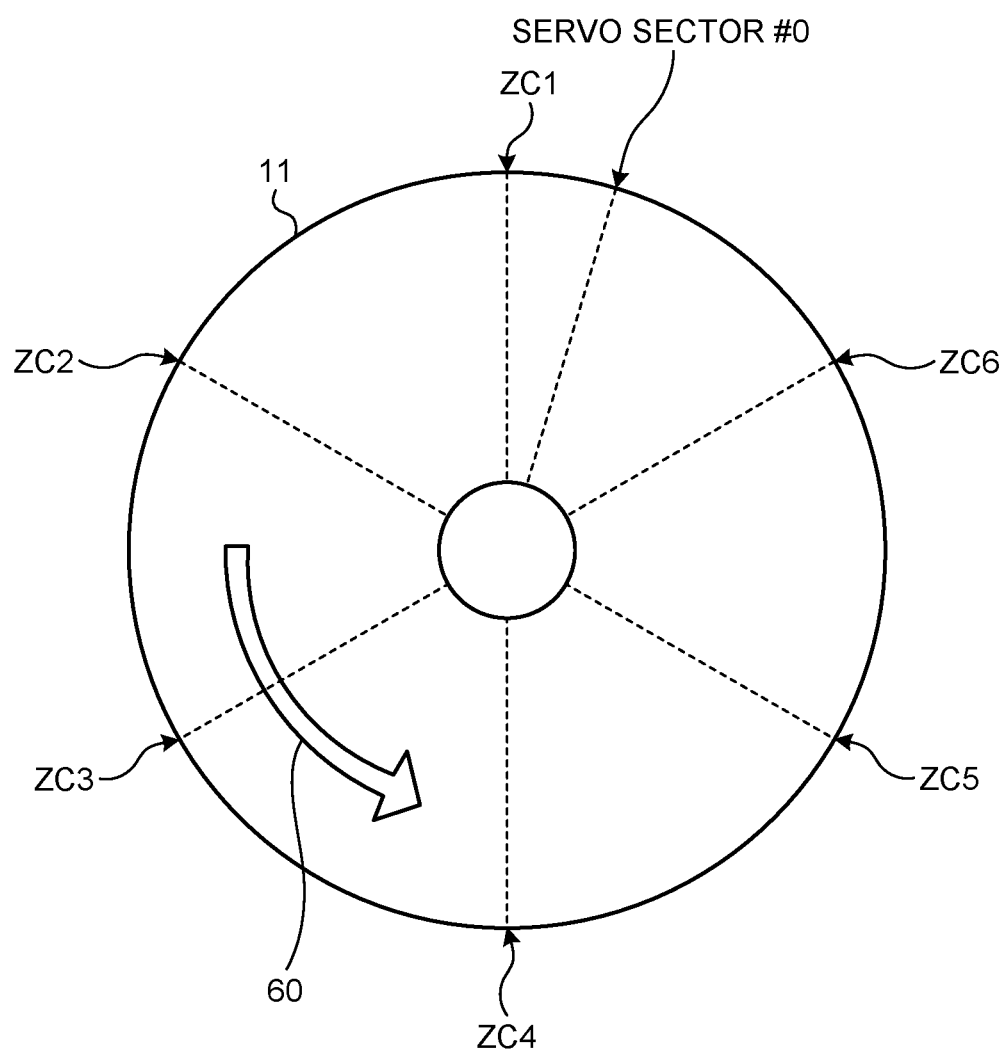
FIG. 3 is a view illustrating a motor position where a value of a motor current crosses zero in association with a position in a circumferential direction of the magnetic disk according to the first embodiment.

FIG. 3 is a view illustrating a motor position where a value of a motor current crosses zero in association with a position in the circumferential direction of the magnetic disk 11 according to the first embodiment.

Note that a description will be given assuming that the spindle motor 12 has twelve magnetic poles in the description of FIG. 3 and the subsequent drawings. In addition, only one of a case where the value of the motor current crosses zero from the positive side to the negative side and a case where the value of the motor current crosses zero from the negative side to the positive side will be considered, and the other will be ignored.

A reading position of the magnetic head 22 moves relative to the magnetic disk 11 in the circumferential direction along with the rotation of the magnetic disk 11. Each of circumferential positions ZC1 to ZC6 indicates a reading position of the magnetic head 22 when the spindle motor 12 is located at the motor position where the value of the motor currents crosses zero. For example, the value of the motor current crosses zero when the magnetic head 22 faces each of the six circumferential positions ZC1 to ZC6. Hereinafter, a motor position where the magnetic head 22 faces a circumferential position ZCX will be referred to as a motor position ZCX. Here, X is an in from one to six.

In addition, a servo sector #0 to which the zeroth servo sector address (hereinafter referred to as a servo sector address #0) is given is located between the circumferential position ZC1 and the circumferential position ZC6 in the circumferential direction of the magnetic disk 11 according to the example illustrated in FIG. 3. Accordingly, when the magnetic disk 11 rotates in a direction indicated by an arrow 60, the spindle motor 12 passes the motor positions ZC6, ZC5, ZC4, ZC3, ZC2, and ZC1 in this order during a period in which the reading position of the magnetic head 22 makes one rotation after passing the servo sector 40.

The motor driver IC 21 can measure a counter electromotive voltage at any of the motor positions ZC1 to ZC6.

During the measurement of the counter electromotive voltage, for example, the supply of the motor current is temporarily stopped. Further, the counter electromotive voltage is measured while the supply of the motor current is stopped. That is, a waveform of the motor current is distorted at a measurement timing of the counter electromotive voltage. The distortion of the waveform of the motor current causes the vibration of the magnetic disk 11, which causes the positional deviation of the magnetic head 22.

Further, the transition of the amount of the positional deviation caused by the distortion of the waveform of the motor current during the period in which the spindle motor 12 makes one rotation changes according to the measurement timing of the counter electromotive voltage during the period in which the spindle motor 12 makes one rotation. That is, for example, the transition of the positional deviation differs depending on a case where the counter electromotive voltage is measured at the motor position ZC6 and a case where the counter electromotive voltage is measured at the motor position ZC5.

During the learning of RRO, the total amount of a deviation including the positional deviation caused by the distortion of the waveform of the motor current is learned. Therefore, for example, when the motor position where the counter electromotive voltage is measured is the same between the time of learning RRO and the time of correction using the learned value of RRO, the total positional deviation including the positional deviation caused by the distortion of the waveform of the motor current can be corrected by the learned value of RRO. However, when the motor position where the counter electromotive voltage is measured differs between the time of learning PRO and the time of correction using the learned value of PRO, it is difficult to correctly correct the positional deviation caused by the measurement of the counter electromotive voltage with the learned value of RRO. That is, the positioning accuracy of the magnetic head deteriorates.

Therefore, the magnetic disk device 1 has a function of adjusting the motor position where the counter electromotive voltage is measured to a motor position set in advance. With this function, the magnetic disk device 1 can measure the counter electromotive voltage at the same motor position between the time of learning RRO and the time of correction using the learned value of RRO. Therefore, the positioning accuracy of the magnetic head 22 can be improved as compared to the case where the motor position where the counter electromotive voltage is measured differs between the time of learning RRO and the time of correction using the learned value of RRO.

Hereinafter, the motor position set in advance as the motor position where the counter electromotive voltage is measured is referred to as a target motor position.

Note that as an example, the motor driver IC 21 is configured to be capable of operating in any operation mode between a first mode and a second mode in the first embodiment. The first mode is a mode in which the counter electromotive voltage is measured only at one of the motor positions ZC1 to ZC6. The second mode is a mode in which the counter electromotive voltage is measured at all the motor positions ZC1 to ZC6.

Figure 4:
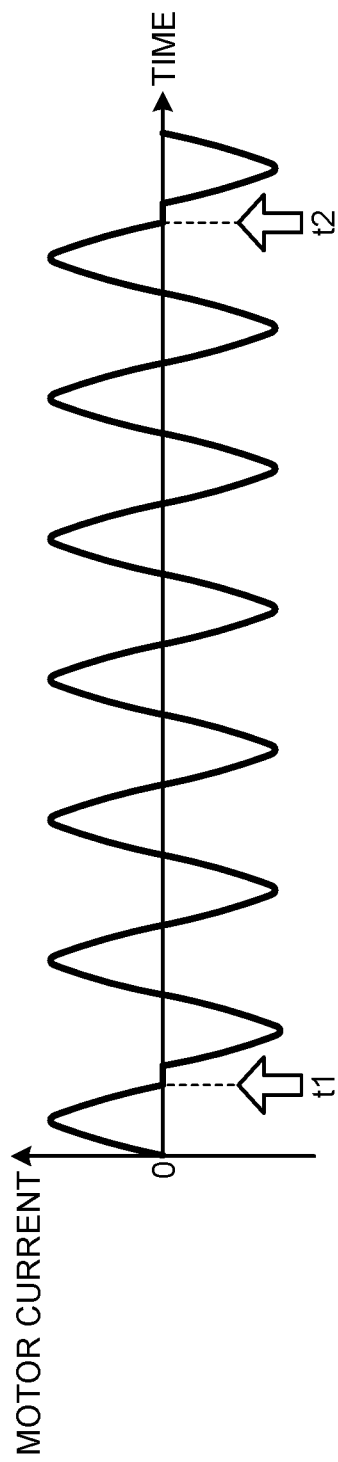
FIG. 4 is a graph obtained by cutting out a part of a waveform of the motor current in a first mode according to the first embodiment.

FIG. 4 is a graph obtained by cutting out a part of the waveform of the motor current in the first mode according to the first embodiment. Note that the timing at which the value of the motor current crosses zero from the positive side to the negative side is defined as a zero-crossing timing at which the counter electromotive voltage can be measured in the description of FIG. 4. A timing at which the value of the motor current crosses zero from the negative side to the positive side is not taken into consideration.

As illustrated in FIG. 4, the motor current basically changes in a sinusoidal waveform. Further, the value of the motor current that changes in the sinusoidal waveform crosses zero at a plurality of timings. Further, at a timing of time t1 out of the plurality of timings, the supply of the motor current is temporarily stopped, and the counter electromotive voltage is measured. That is, the waveform of the motor current is distorted at time t1.

Note that the spindle motor 12 is located at one of the motor positions ZC1 to ZC6 at time t1. This one motor position is referred to as a specific motor position in the description of FIG. 4.

After the counter electromotive voltage is measured at time t1, the motor current of five cycles is supplied without performing the measurement of the counter electromotive voltage. Further, at time t2 when the motor current of six cycles is supplied from time t1, the spindle motor 12 reaches the above-described specific motor position, and the measurement of the counter electromotive voltage is executed again.

In this manner, the counter electromotive voltage is measured once every time the motor current of six cycles is supplied according to the first mode. As a result, every time the spindle motor 12 makes one rotation, the counter electromotive voltage is measured at the same motor position as the motor position where the counter electromotive voltage has been measured previous time.

Note that, in the first embodiment, the motor position where the counter electromotive voltage is measured is determined based on the number of times the spindle motor 12 has reached the motor positions ZC1 to ZC6 since the start of the operation in the first mode, in other words, the number of times the value of the motor current crosses zero since the start of the operation in the first mode.

More specifically, the motor driver IC 21 count, for example, the number of times the spindle motor 12 has reached the motor positions ZC1 to ZC6 since the start of the operation in the first mode (or the number of times the value of the motor current crosses zero since the start of the operation in the first mode). Further, when a count value reaches a predetermined value N (N is an integer from one to six, for example), the motor driver IC 21 executes the first measurement of the counter electromotive voltage since the start of the operation in the first mode. When the first measurement of the counter electromotive voltage is completed, the motor driver IC 21 executes the measurement of the counter electromotive voltage at the same motor position as a motor position where the first measurement of the counter electromotive voltage has been performed every time the rotor of the spindle motor 12 makes one rotation.

As an example, in a case where "1" is set as the value N, the motor driver IC 21 executes the first measurement of the counter electromotive voltage when the number of times the rotor of the spindle motor 12 has reached the motor positions ZC1 to ZC6 since the start of the operation in the first mode (or the number of times the value of the motor current crosses zero since the start of the operation in the first mode) becomes "1". Thereafter, the counter electromotive voltage is measured at the same motor position as the motor position where the first measurement of the counter electromotive voltage has been performed.

As another example, in a case where "6" is set as the value N, the motor driver IC 21 executes the first measurement of the counter electromotive voltage when the number of times the rotor of the spindle motor 12 has reached the motor positions ZC1 to ZC6 since the start of the operation in the first mode (or the number of times the value of the motor current crosses zero since the start of the operation in the first mode) becomes "6". Thereafter, the counter electromotive voltage is measured at the same motor position as the motor position where the first measurement of the counter electromotive voltage has been performed.

Note that a designer can set any value as the value N. In the following description, it is assumed that "6" is set as the value N as one example. That is, it is assumed that the first measurement of the counter electromotive voltage is executed at the sixth zero-crossing timing since the start of the operation in the first mode.

Figure 5:
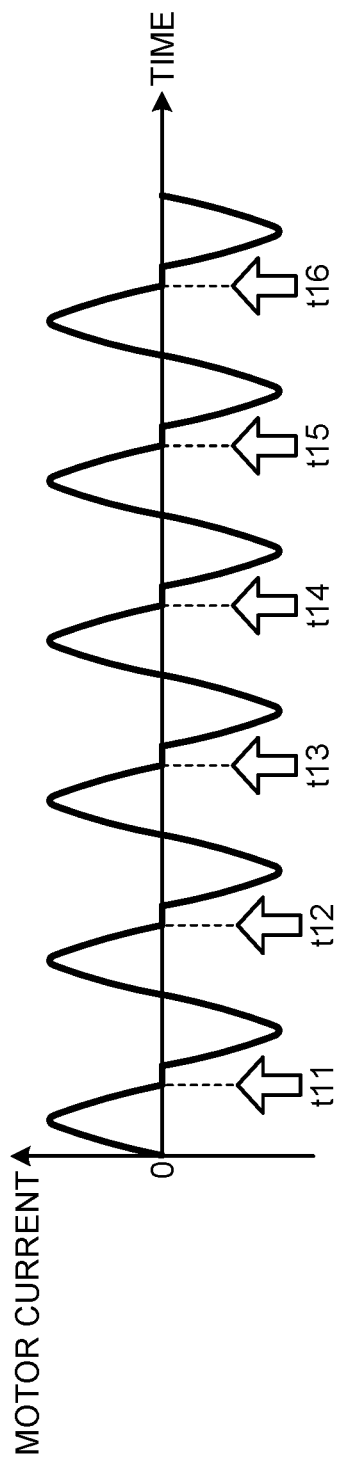
FIG. 5 is a graph obtained by cutting out a part of a waveform of the motor current in a second mode according to the first embodiment.

FIG. 5 is a graph obtained by cutting out a part of the waveform of the motor current in the second mode according to the first embodiment. In this drawing as well, the timing at which the value of the motor current crosses zero from the positive side to the negative side is defined as the zero-crossing timing at which the counter electromotive voltage can be measured, which is similar to FIG. 4.

As illustrated in FIG. 5, the motor current basically changes in a sinusoidal waveform, but the measurement of the counter electromotive voltage is executed at all times t11 to t16 when the value of the motor current crosses zero from the positive side to the negative side. Accordingly, the counter electromotive voltage is measured six times during the period. In which the spindle motor 12 makes one rotation in the second mode.

In the second mode, the counter electromotive voltage is measured more frequently as compared to the first mode, so that the current rotational speed can be acquired more frequently as compared to the first mode. Accordingly, it is possible to execute finer speed control in the second mode than that in the first mode.

On the other hand, in the second mode, the supply of the motor current is temporarily stopped more often as compared to the first mode, so that the influence of the vibration of the magnetic disk 11 is larger than that in the first mode.

Therefore, when read and write are performed with respect to the magnetic disk 11 by the magnetic head 22, the controller 30 operates the motor driver IC 21 in the first mode. In addition, the controller 30 operates the motor driver IC 21 in the first mode at the time of learning RRO such that the correction of RRO can be accurately executed in the first mode.

Here, the controller 30 causes the motor driver IC 21 to once operate in the second mode after the start of rotation of the magnetic disk 11, and then, causes the motor driver IC 21 to transition from the second mode to the first mode. The controller 30 determines a timing of the transition from the second mode to the first mode based on the servo information read by the magnetic head 22 such that the counter electromotive voltage can be measured at the target motor position after the transition from the second mode to the first mode.

A method for determining the timing of the transition from the second mode to the first mode based on the servo information is not limited to a specific determination method. Two examples will be described hereinafter.

In a first example, the transition from the second mode to the first mode is executed at a timing when a specific servo sector address (for example, the servo sector address #0) serving as a reference is read. According to the example in FIG. 3, when the transition from the second mode to the first mode is executed immediately after the servo sector address #0 is read, a zero-crossing timing corresponding to the motor position ZC6, a zero-crossing timing corresponding to the motor position ZC5, a zero-crossing timing corresponding to the motor position. ZC4, a zero-crossing timing corresponding to the motor position ZC3, a zero-crossing timing corresponding to the motor position ZC2, and a zero-crossing timing corresponding to the motor position ZC1 arrive in this order during the first rotation immediately after the transition from the second mode to the first mode. Accordingly, when the value N is "6", the first measurement of the counter electromotive voltage after the start of the operation in the first mode is executed at the zero-crossing timing corresponding to the motor position ZC1. Further, thereafter, the counter electromotive voltage is measured at the zero-crossing timing corresponding to the motor position ZC1 every time the spindle motor 12 makes one rotation.

Note that the target motor position is uniquely determined by the value N according to the first example. According to the example of FIG. 3, the target motor position can be expressed as a motor position ZC(7−N).

In a second example, after the specific servo sector address (for example, the servo sector address #0) serving as the reference is read, the transition from the second mode to the first mode is executed at a timing when the zero-crossing timing has elapsed a predetermined number of times (referred to as M times). M is an integer from zero to six.

For example, a case where, for example, "6" is set as the value N and "2" is set as the value M is taken in to consideration. According to the example, in FIG. 3, when the zero-crossing timing corresponding to the position ZC has elapsed twice (=M) since detection of the servo sector #0, the rotor of the spindle motor 12 passes the motor position ZC5. Accordingly, during the first rotation immediately after the transition from the second mode to the first mode, the zero-crossing timing corresponding to the motor position ZC4, the zero-crossing timing corresponding to the motor position ZC3, the zero-crossing timing corresponding to the motor position ZC2, the zero-crossing timing corresponding to the motor position ZC1, the zero-crossing timing corresponding to the motor position ZC6, and the zero-crossing timing corresponding to the motor position ZC5 arrive in this order. Further, the first measurement of the counter electromotive voltage is executed after the start of the operation in the first mode at the zero-crossing timing corresponding to the motor position ZC5, which is the zero-crossing timing that arrives for the sixth (=N) time among these zero-crossing timings. Further, thereafter, the counter electromotive voltage is measured at the zero-crossing timing corresponding to the motor position ZC5 every time the spindle motor 12 makes one rotation.

When the second example is applied, the target motor position is uniquely determined by the value N and the value M. According to the example of FIG. 3, the target motor position can be represented by a motor position. ZC(mod ((13−M−N), 6)). Note that mod (a, b) indicates the remainder obtained by dividing a by b.

The designer can set any value as the value M. When "0" is set as the value M, a behavior of the magnetic disk device 1 in the second example is equal to a behavior of the magnetic disk device 1 in the first example. The designer can set the target motor position by setting the value N in the first example and the value N and the value M in the second example.

Note that a reference position for determining the timing of transition to the first mode is not limited to a position indicated by the servo sector address #0. The designer can set any servo sector address as the reference position for determining the timing of transition from the second mode to the first mode.

Figure 6:
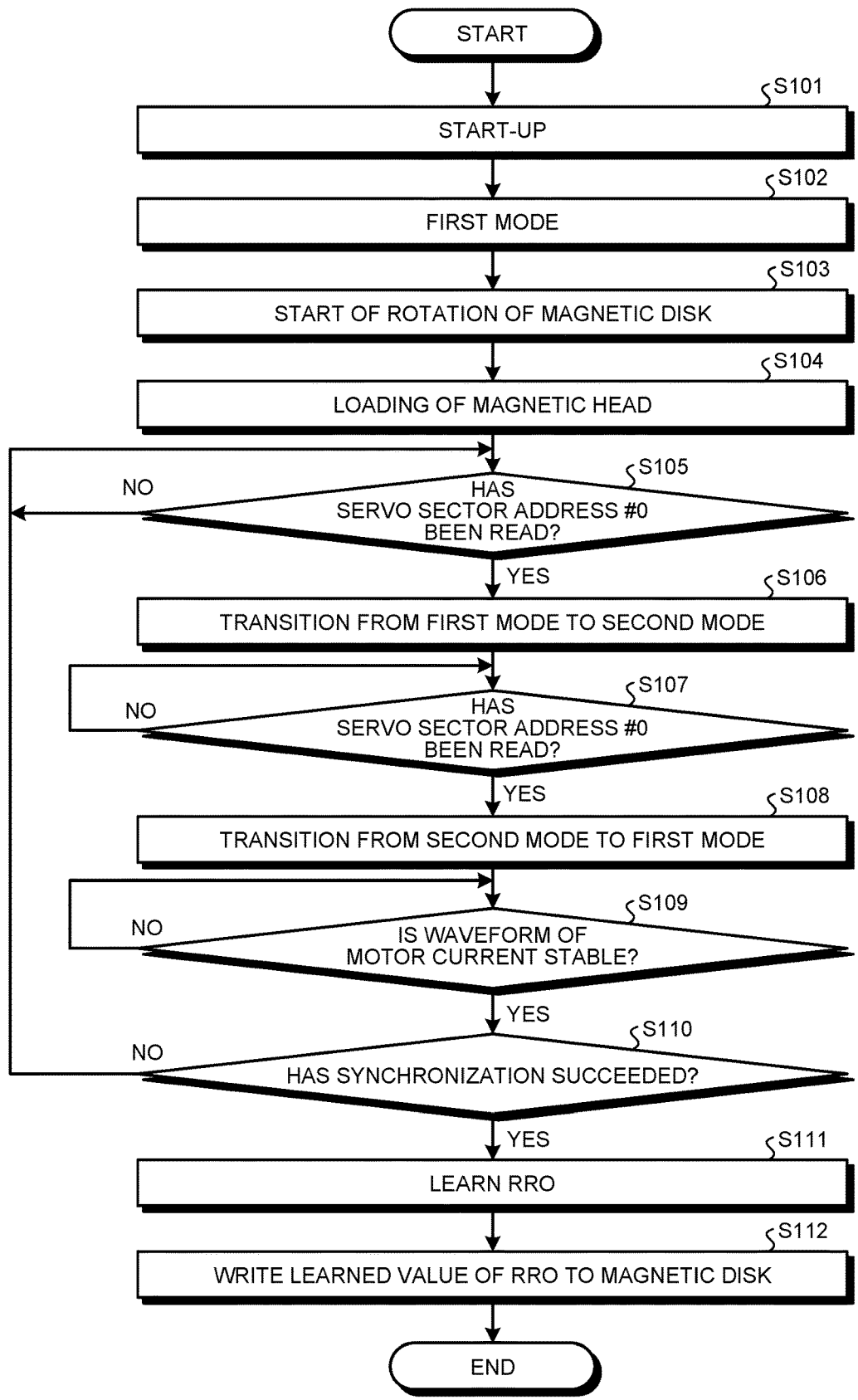
FIG. 6 is a flowchart illustrating an example of an operation of the magnetic disk device according to the first embodiment at the time of learning RRO.

FIG. 6 is a flowchart illustrating an example of an operation of the magnetic disk device 1 according to the first embodiment at the time of learning RRO. Note that a description will be given assuming that the first example described above is applied in FIGS. 6 to 8. In addition, it is assumed that the servo sector address #0 is set as the reference position for determining the timing of transition from the second mode to the first mode.

In addition, the operation of the controller 30 is implemented, specifically, as the processor 26 controls the HDC 23, the head IC 24, and the RNC 25 in the following description. Note that some or ail of the control performed by the processor 26 may be implemented by a component different from the processor 26 (for example, the HDC 23).

The learning of RRO is executed, for example, after hardware of the magnetic disk device 1 is manufactured. The magnetic disk device 1 whose hardware has been manufactured is connected to a predetermined device (for example, a computer) and started up (powered on). When the magnetic disk device 1 is started up (S101), the controller 30 sets an operation mode of the motor driver IC 21 to the first mode (S102). The motor driver IC 21 starts the rotation of the spindle motor 12 in the first mode, and as a result, the magnetic disk 11 starts rotating (S103).

The motor driver IC 21 starts the operation in the first mode by S103. That is, the counter electromotive voltage is measured only at one motor position ZC out of the motor positions ZC1 to ZC6, and the speed control is executed based on the obtained measured value.

When the value N is "6", the first measurement of the counter electromotive voltage is performed when the zero-crossing timing has elapsed six times since the start of the operation of the first mode by S103. Accordingly, for example, when a position of the spindle motor 12 at the start of rotation of the rotor is between the motor position ZC3 and the motor position ZC4, the first measurement of the counter electromotive voltage is performed at the motor position ZC4. For example, if the position of the spindle motor 12 at the start of rotation of the rotor is between the motor position ZC5 and the motor position ZC6, the first measurement of the counter electromotive voltage is performed at the motor position ZC6.

That is, in the operation of the first mode started by S103, the position where the counter electromotive voltage is measured varies depending on the position of the spindle motor 12 at the time of start-up.

No matter which motor position the counter electromotive voltage is measured during the operation in the first mode started by S103, the motor position where the counter electromotive voltage is measured is changed to the target motor position (motor position ZC1 in the examples of FIGS. 6 to 8) by the subsequent processing.

Subsequent to S103, the controller 30 loads the magnetic head 22 from The ramp 13 onto the magnetic disk 11 (S104). The controller 30 can read a servo sector address and a track address at a position that the magnetic head 22 faces on the magnetic disk 11 by the magnetic head 22.

Subsequently, the controller 30 monitors servo sector numbers sequentially read by the magnetic head 22 to determine whether the servo sector number 40 has been read by the magnetic head 22 (S105).

If the servo sector number #0 has not been read (S105: No), the controller 30 executes the determination process of S105 again. The controller 30 repeatedly executes the determination process of S105 until the servo sector number 40 is read, and waits for arrival of the timing at which the servo sector number #0 is read.

When the servo sector number #0 has been read (S105: Yes), the controller 30 causes the operation mode of the motor driver IC 21 to immediately transition from the first mode to the second mode (S106). As a result, the motor driver IC 21 starts operating in the second mode. That is, the motor driver IC 21 measures the counter electromotive voltage at all zero-crossing timings.

Further, the controller 30 monitors servo sector numbers sequentially read by the magnetic head 22 to determine whether the servo sector number #0 has been read by the magnetic head 22 (S107). If the servo sector number #0 has not been read (S107: No), the controller 30 executes the determination process of S107 again. The controller 30 repeatedly executes the determination process of S107 until the servo sector number #0 is read, and waits for arrival of the timing at which the servo sector number #0 is read.

When the servo sector number #0 has been read (S107: Yes), the controller 30 causes, the operation mode of the motor driver IC 21 to immediately transition from the second mode to the first mode (S108). As a result, the motor driver IC 21 starts operating again in the first mode.

Here, "6" is set as the value N. Therefore, as described in the description of the first example, the first measurement of the counter electromotive voltage is performed at the motor position ZC1 after the operation in the first mode is resumed by S108. That is, the first measurement of the counter electromotive voltage is performed at the target motor position. Further, as long as the operation in the first mode continues, the counter electromotive voltage is measured only at the motor position ZC1, which is the target motor position, among the motor positions ZC1 to ZC6.

Note that it is possible to execute the finer speed control in the second mode than the first mode as described above. Accordingly, for example, after the process of S106 is performed, the operation in the second mode may continue until a rotational speed of the spindle motor 12 (that is, the magnetic disk 11) reaches a predetermined speed, and the process of S107 may be performed after the spindle motor 12 reaches the predetermined speed.

Note that speed control is also possible in the first mode. Accordingly, it goes without saying that the process of S107 may be performed without waiting for the rotational speed of the spindle motor 12 (that is, the magnetic disk 11) to reach the predetermined speed after the process of S106 is performed.

The waveform of the motor current differs between the first mode and the second mode. When the operation mode transitions from the second mode to the first mode, it takes some time until the waveform of the motor current becomes stable. Accordingly, after S108, the controller 30 determines whether the waveform of the motor current is stable (S109). If the waveform of the motor current is not stable (S109: No), the controller 30 executes the determination process of S109 again.

If the waveform of the motor current is stable (S109: Yes), the controller 30 determines whether synchronization has succeeded (S110).

The synchronization means that the measurement of the counter electromotive voltage is performed only at the target motor position (here, motor position ZC1). That is, the controller 30 determines whether the counter electromotive voltage is measured at the motor position ZC1 in S110.

If the synchronization has not succeeded for some reason (S110: No), the controller 30 redoes a series of processes from the process of S105.

If the synchronization has succeeded (S110: Yes), the controller 30 starts learning of RRO (S111). When the learning of PRO is completed, the controller 30 writes the learned value of RRO to the magnetic disk 11 (more specifically, the servo area 42) as a post code by the magnetic head 22 (S112), and ends the operation at the time of learning PRO.

Note that the determination process of S105 in the series of processes illustrated in FIG. 6 can be omitted. The controller 30 may transition from the first mode to the second mode without waiting for the read of the servo sector number #0.

In addition, the controller 30 may cause the motor driver IC 21 to operate in the second mode in S102 after start-up (S101). In such a case, the processes of S105 and S106 are omitted.

Figure 7:
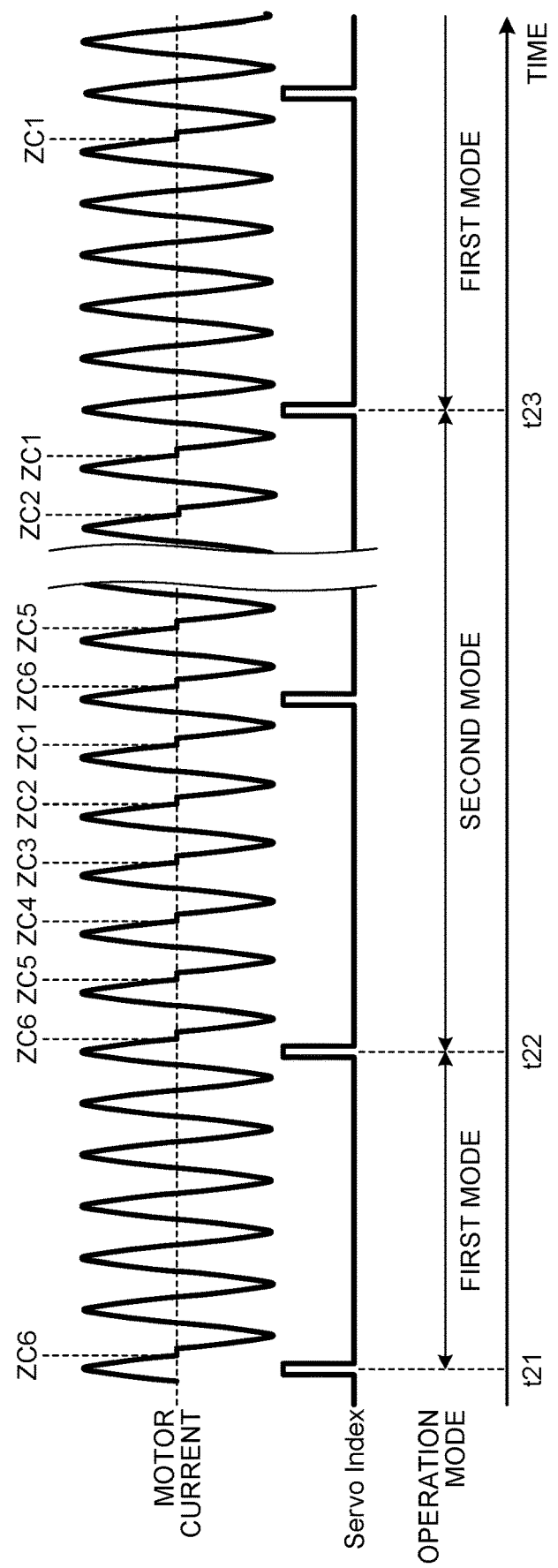
FIG. 7 is a view for describing an example in which a motor position where a counter electromotive voltage is measured is adjusted to a target motor position in the magnetic disk device according to the first embodiment.

FIG. 7 is a view for describing an example in which the motor position where the counter electromotive voltage is measured is adjusted to the target motor position. In this drawing, a servo index indicates a timing at which the servo sector address #0 is read. Specifically, a timing when the servo index reaches an H level represents the timing when the servo sector address #0 is read.

In a period up to time t22, the operation in the first mode started by S102 in FIG. 6 is performed. An interval at which the servo index reaches the H level, for example, a period from time t21 to time t22, corresponds to a period in which a reading position by the magnetic head. 22 makes one rotation with the servo sector address #0 as a reference. In the period up to time t22, the counter electromotive voltage is measured at the first zero-crossing timing after the servo sector address #0 has been read, in other words, at the timing when the spindle motor 12 is located at the motor position ZC6. That is, the counter electromotive voltage is measured at the motor position different from the target motor position.

At time t22, it is determined as Yes in the determination process of S105 in FIG. 6, and the operation mode of the motor driver IC 21 immediately transitions from the first mode to the second mode by the process of S106. After the servo sector address #0 is read at time t22, the spindle motor 12 passes the motor position ZC6, the motor position ZC5, the motor position ZC4, the motor position ZC3, the motor position ZC2, and the motor position ZC1 in this order, and the measurement of the counter electromotive voltage is executed at all of these motor positions.

At time t23, it is determined as Yes in the determination process of S107 in FIG. 6, and the operation mode of the motor driver IC 21 immediately transitions from the second mode to the first mode by the process of S108. Since it is assumed that "6" is set as the value N, the counter electromotive voltage is measured at the zero crossing timing corresponding to the motor position ZC1 which is the zero-crossing timing that arrives for the sixth time after the operation in the first mode is resumed at time t23.

As described above, a motor position as a change destination is uniquely determined by the value N when the first example is applied. When the value N is "6", the motor position as the change destination is the target motor position ZC1. That is, even when the counter electromotive voltage is measured at the motor position ZC6 different from the target motor position ZC1 as illustrated as the state up to the time t22 in FIG. 7, the motor position where the counter electromotive voltage is measured can be changed to the target motor position ZC1 by the adjustment executed from time t22 to time t23.

Figure 8:
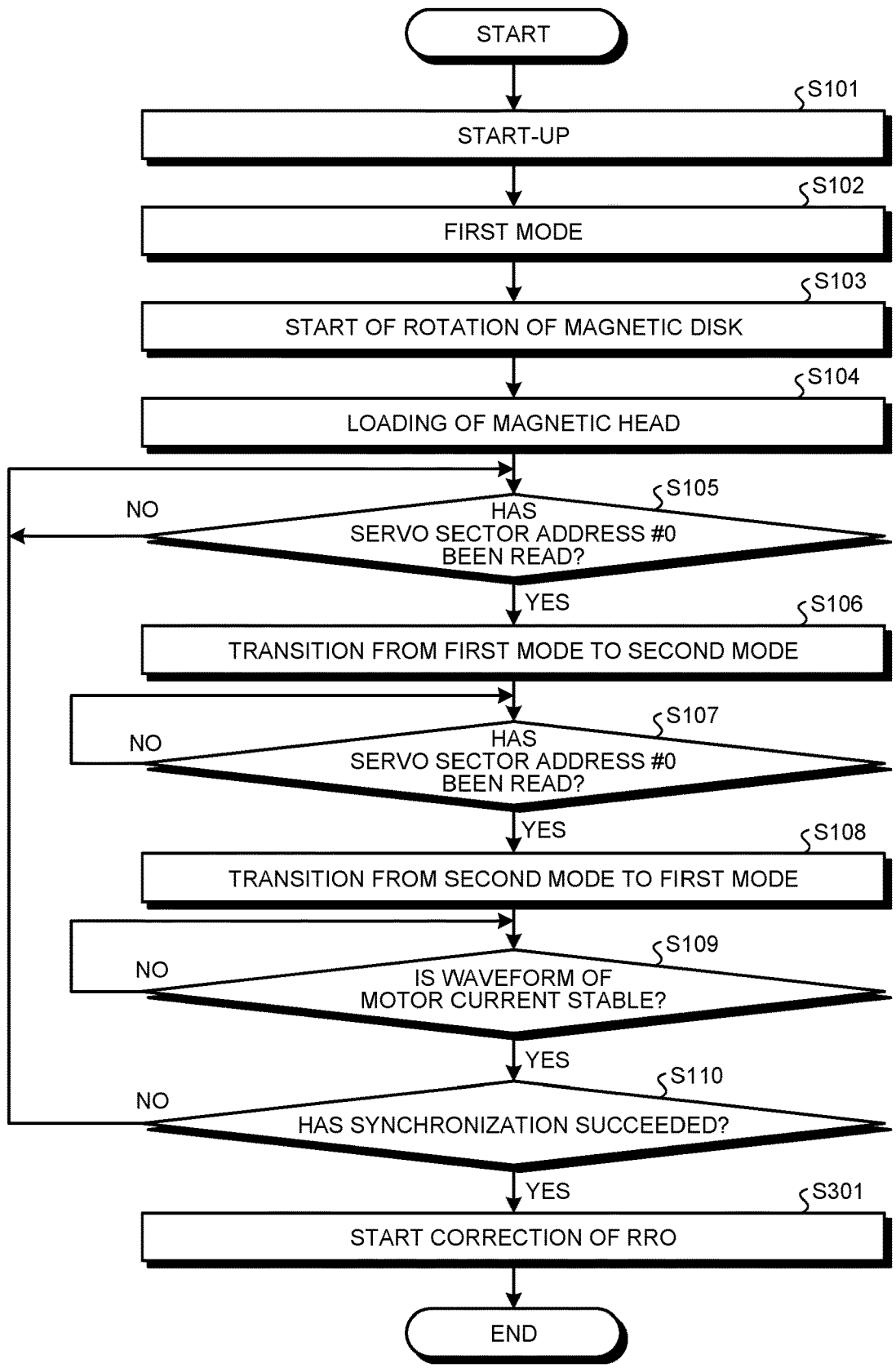
FIG. 8 is a flowchart illustrating an example of the operation of the magnetic disk device when a user uses the magnetic disk device according to the first embodiment.

FIG. 8 is a flowchart illustrating an example of the operation of the magnetic disk device 1 when a user uses the magnetic disk device 1 according to the first embodiment.

The user connects, to the host 2, the magnetic disk device 1 in a state where the learning of RRO has been completed and uses the magnetic disk device 1. The magnetic disk device 1 is connected to the host 2 and is started up (powered on). Even when being used by the user, the magnetic disk device 1 executes the same processing as the time of learning RRO from the start-up (S101) to the determination process (S110) on whether synchronization has succeeded. As a result, the motor position ZC at which the counter electromotive voltage is measured during the operation in the first mode can be adjusted to the target motor position ZC1 as in the time of learning RRO.

After the synchronization has succeeded (S110: Yes), the magnetic disk device 1 starts to control the correction of RRO based on the post code, that is, the learned value of RRO (S301). As a result, read and write to and from the magnetic disk 11 becomes possible. Further, the operation of the magnetic disk device 1 when the user uses the magnetic disk device 1 of the first embodiment ends.

The learning of RRO is performed in a state where the counter electromotive voltage is measured at the target motor position ZC1. Further, the counter electromotive voltage is measured at the target motor position ZC1 when the user uses the magnetic disk device 1. That is, the motor position at which the counter electromotive voltage is measured is the same between the time of learning RRO and the time when the user uses the magnetic disk device 1. Accordingly, it is possible to accurately correct the positional deviation of the magnetic head 22 due to the measurement of the counter electromotive voltage at the motor position, which occurs when the user uses the magnetic disk device 1, by the learned value of RRO.

Note that the determination process of S105 can be omitted in FIG. 8. The controller 30 may transition from the first mode to the second mode without waiting for the read of the servo sector number #0.

In addition, the controller 30 may cause the motor driver IC 21 to operate in the second mode in S102 after start-up (S101). In such a case, the processes of S105 and S106 are omitted.

Note that it is assumed that the first example is applied in the description of FIGS. 6 to 8. In the first embodiment, the second example may be applied. If the second example is applied, the controller 30 executes the process of S108 when the zero-crossing timing has elapsed M times after it is determined as Yes in the determination process of S107.

As described above, according to the first embodiment, the controller 30 executes the control to adjust the motor position where the counter electromotive voltage is measured to the set first position (the target motor position, that is, the motor position ZC1 according to the examples of FIGS. 6 to 8) after the start of rotation of the magnetic disk 11.

With this configuration, the magnetic disk device 1 can measure the counter electromotive voltage at the same motor position between the time of learning RRO and the time of correction using the learned value of RRO. Accordingly, the positioning accuracy of the magnetic head 22 can be improved as compared to the case where the motor position where the counter electromotive voltage is measured differs between the time of learning RRO and the time of correction using the learned value of RRO.

Note that the first position, which is the target motor position, can be set by the value N in the first example. In the second example, the first position can be set by the combination of the value N and the value M. Note that the method of setting the first position is not limited to these.

In addition, according to the first embodiment, the controller 30 can change the motor position where the counter electromotive voltage is measured from the second position to the first position even if the motor position where the counter electromotive voltage is measured is the second position (for example, any position other than the motor position ZC1 among the motor positions ZC1 to ZC6) different from the first position (motor position ZC1 according to FIGS. 6 to 8).

Accordingly, the positioning accuracy of the magnetic head 22 can be improved as compared to the case where the motor position where the counter electromotive voltage is measured differs between the time of learning RRO and the time of correction using the learned value of RRO.

In addition, according to the first embodiment, the controller 30 adjusts the motor position where the counter electromotive voltage is measured to one motor position set among a plurality of third positions (for example, the motor positions ZC1 to ZC6) where the value of the motor current crosses zero.

In addition, according to the first embodiment, the motor driver IC 21 transitions from the second mode to the first mode at the timing based on the servo information read by the magnetic head 22.

As a result, the motor position where the counter electromotive voltage is measured can be adjusted to the target motor position.

Second Embodiment

In the first embodiment, the motor position where the counter electromotive voltage is measured is adjusted in both the time of learning RRO and the time when the user uses the magnetic disk device 1.

On the other hand, in a second embodiment, a motor position where a counter electromotive voltage has been measured is stored without adjusting the motor position where the counter electromotive voltage is measured at the time of learning RRO. Further, when a user uses the magnetic disk device 1, a motor position where a counter electromotive voltage is measured is adjusted to the motor position stored in advance. That is, a target motor position is determined at the time of learning RRO.

Hereinafter, matters different from those of the first embodiment be described. The same matters as those in the first embodiment will be briefly described or omitted.

FIG. 9 is a flowchart illustrating an example of an operation of the magnetic disk device 1 according to the second embodiment at the time of learning RRO.

When the magnetic disk device 1 is started up (S101), the same processing as in the first embodiment is executed up to S105. That is, after start-up, the operation in the first mode starts, and the read of the servo sector address 40, which is an example of a reference position, is executed.

After the servo sector address #0 has been read by the magnetic head 22 (S105: Yes), the controller 30 stores setting information indicating a motor position where the counter electromotive voltage is measured (S401). For example, if the counter electromotive voltage is measured at a certain motor position ZC since the start of the operation in the first mode in S102, information that can identify the motor position ZC is stored as the setting information.

For example, the controller 30 can store a positional relationship between the servo sector address #0 and the motor position where the counter electromotive voltage is measured as the setting information. The positional relationship may be expressed as an angular difference of the spindle motor 12 or may be expressed as the number of times a reading position of the magnetic head 22 has passed any of the motor positions ZC1 to ZC6 since reading of the servo sector address #0 (in other words, the number of zero-crossing timings).

Here, as an example, it is assumed that the number of times the reading position of the magnetic head 22 has passed any of the motor positions ZC1 to ZC6 until the reading position of the magnetic head 22 passes the motor position ZC where the measurement of the counter electromotive voltage is being executed since reading of the servo sector address #0 (in other words, the number of times of zero-crossing timing) is stored as the setting information.

A storage location of the setting information is not limited to a specific location. For example, the setting information may be stored in the FROM 28. Alternatively, the setting information may be temporarily stored in the RAM 27 and be migrated from the RAM 27 to the FROM 28 or a nonvolatile storage area such as the magnetic disk 11 at a predetermined timing until the power of the magnetic disk device 1 is turned off.

Subsequent to S401, the controller 30 starts learning of RRO (S111). When the learning of RRO is completed, the controller 30 writes the learned value of PRO to the magnetic disk 11 (more specifically, the servo area 42) as a post code by the magnetic head 22 (S112), and ends the operation at the time of learning RRO.

Note that the timing at which the process of S401 is executed is not necessarily set to be immediately after the process of S105. The process of S401 may be executed after S112.

With the above operation, the learning of RRO is completed, and the motor position ZC where the counter electromotive voltage has been measured when the learning of RRO has been performed is stored as the target motor position.

FIG. 10 is a flowchart illustrating an example of the operation of the magnetic disk device 1 when a user uses the magnetic disk device 1 according to the second embodiment.

When the magnetic disk device 1 is used by the user, the same processing as in the first embodiment is executed up to S107 if the magnetic disk device 1 is started up (S101). That is, after start-up, the motor driver IC 21 starts operating in the first mode, then transitions to the second mode, and reads the servo sector address #0 which is an example of the reference position (S107).

Then, the timing of the transition to the first mode is adjusted such that the counter electromotive voltage can be measured at the target motor position (that is, the same motor position as the time of learning RRO) based on the timing when the servo sector address #0 has been read and the setting information.

Here, when the transition from the second mode to the first mode is executed at the timing when the zero-crossing timing has elapsed a predetermined number of times (referred to as P times) since reading of the servo sector address #0, the motor position where the counter electromotive voltage is measured after the transition to the first mode is uniquely determined by the motor position ZC(mod((13−P−N), 6)).

Further, according to the example of FIG. 10, the number of times the reading position of the magnetic head 22 has passed any of the motor positions ZC1 to ZC6 until the reading position of the magnetic head 22 passes the motor position ZC since reading of the servo sector address #0 (in other words, the number of times of zero-crossing timing) is stored as the setting information. If the number of times recorded in the setting information is represented by Q (however, Q is an integer from one to six), the motor position ZC where the counter electromotive voltage has been measured at the time of learning RRO can be represented by a motor position ZC(mod((7−Q), 6)).

Accordingly, the value P for adjusting the motor position ZC where the counter electromotive voltage is measured to the motor position ZC, where, the counter electromotive voltage has been measured at the time of learning RRO can be obtained by solving the following Formula (1).

$$ZC(\mod((13-P-N),6))=ZC(\mod((7-Q),6)) \quad (1)$$

Since it is assumed that the value IST is "6", the solution. P=Q can be obtained by Formula (1). That is, the controller 30 can adjust the motor position to the motor position where the counter electromotive voltage has been measured at the time of learning RRO if the transition from the second mode to the first mode can be performed at the timing when the spindle motor 12 passes the motor position indicated by the setting information since reading of the servo sector address #0.

After the servo sector address #0 has been read by the magnetic head 22 (S107: Yes), the controller 30 determines whether the spindle motor 12 has passed the motor position indicated by the setting information (S501). If the spindle motor 12 has not passed the motor position ZC indicated by the setting information (S501: No), the controller 30 executes the determination process of S501 again.

When the spindle motor 12 has passed the motor position ZC indicated by the setting information (S501: Yes), the controller 30 causes the operation mode of the motor driver IC 21 to immediately transition from the second mode to the first mode (S108). As a result, it is possible to measure the counter electromotive voltage at the motor position ZC where the counter electromotive voltage has been measured at the time of learning RRC.

Thereafter, the processes of S108 to S301 are executed as in the first embodiment, and the operation of the magnetic disk device 1 when the user uses the magnetic disk device 1 of the second embodiment ends.

As described above, the controller 30 executes control to learn RRO and write the learned value of RRO to the magnetic disk 11 according to the second embodiment. The motor driver IC 21 measures the counter electromotive voltage at a fourth position (for example, any one of the motor positions ZC1 to ZC6) at the time of learning RRO. Further, the controller 30 sets the fourth position as the first position (that is, the target motor position).

As a result, the motor position adjustment processing is unnecessary at the time of learning RRO.

In addition, the controller 30 stores the positional relationship between the reference position (for example, the servo sector address #0) based on the servo information and the fourth position as the setting information according to the second embodiment.

As a result, the magnetic disk device 1 can measure the counter electromotive voltage at the same motor position as the motor position where the counter electromotive voltage has been measured at the time of learning RRO when using the learned value of RRO.

Note that the description has been given in the first embodiment and the second embodiment assuming that the controller 30 controls a mode switching timing of the motor driver IC 21. The motor driver IC 21 may have a function of determining the mode switching timing.

For example, the processes S105 to S110 in FIGS. 6 and 8 and the processes S105 to S110 in FIG. 10 may be executed by the motor driver IC 21 alone. For example, the controller 30 instructs the motor driver IC 21 to adjust the motor position where the counter electromotive voltage is measured after the process of S104. The motor driver IC 21 can execute the processes S105 to S110 of FIG. 6, FIG. 8, or FIG. 10 in response to the instruction from the controller 30.

In addition, the operation mode of the motor driver IC 21 once transitions to the second mode, and then transitions to the first mode when adjusting the motor position where the counter electromotive voltage is measured in the first embodiment and the second embodiment. When adjusting the motor position where the counter electromotive voltage is measured, the motor driver IC 21 does not necessarily transition to the second mode. When operating in the first mode, the motor driver IC 21 may change the motor position where the counter electromotive voltage is measured from a motor position where the counter electromotive voltage is currently measured to the target motor position in response to the instruction from the controller 30.

In addition, the magnetic disk device 1 has the configurations as described in the first embodiment and the second embodiment, and thus, has the following characteristic behaviors with respect to the motor current of the spindle motor 12. That is, in the magnetic disk device 1, a waveform of the motor current is distorted when the motor position of the spindle motor 12 is at a certain position (for example, the motor position ZC6) at a first timing after the start of rotation of the magnetic disk 11 (for example, in FIG. 7, the timing corresponding to the motor position ZC6 in the period from time t21 to time t22), and the waveform of the motor current is distorted at a position other than the above-described position (for example, the motor position ZC1) at a second timing subsequent to the first timing (for example, the timing corresponding to the motor position ZC1 after time t23 in FIG. 7).

In addition, the magnetic head 22 is loaded after the rotation of the spindle motor 12 is started. The movement of the position where the waveform of the motor current is distorted occurs after the loading of the magnetic head 22.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a spindle motor that rotates the magnetic disk;
a motor driver that supplies a motor current to the spindle motor and starts measuring a counter electromotive voltage of the spindle motor every time the spindle motor makes one rotation at a first position among a plurality of second positions, each of the plurality of second positions being a motor position where a value of the motor current crosses zero; and
a controller that changes, after the magnetic disk starts rotating, a motor position where the counter electromotive voltage is measured every time the spindle motor makes one rotation from the first position to a set third position among the plurality of second positions.

2. The magnetic disk device according to claim 1, wherein the motor driver is capable of operating in any operation mode of a first mode in which the counter electromotive voltage is measured only at one of the plurality of second positions and a second mode in which the counter electromotive voltage is measured at all of the plurality of second positions, and
after the magnetic disk starts rotating, the motor driver transitions from the second mode to the first mode and measures the counter electromotive voltage only at the third position.

3. The magnetic disk device according to claim 2, further comprising
a magnetic head,
wherein servo information is recorded in the magnetic disk,
the controller reads the servo information by the magnetic head, and
the motor driver transitions from the second mode to the first mode at a timing based on the servo information read by the magnetic head.

4. The magnetic disk device according to claim 1, wherein the controller executes control to learn repeatable run-out (RRO) and write a learned value of the RRO to the magnetic disk,
the motor driver measures the counter electromotive voltage at a fourth position during the learning of the RRO, and
the controller sets the fourth position as the third position.

5. The magnetic disk device according to claim 4, further comprising
a magnetic head,
wherein servo information is recorded in the magnetic disk, and
the controller stores a positional relationship between a reference position based on the servo information and the fourth position.

6. The magnetic disk device according to claim 5, wherein the motor driver controls a rotational speed of the spindle motor based on a measured value of the counter electromotive voltage.

7. The magnetic disk device according to claim 1, wherein the first position is, among the plurality of second positions, a second position depending on a position of the spindle motor at a time of start-up of the magnetic disk device.

8. A method for controlling a magnetic disk device, which includes: a magnetic disk; a spindle motor that rotates the magnetic disk; and a motor driver that supplies a motor current to the spindle motor, the method comprising
starting measuring a counter electromotive voltage of the spindle motor every time the spindle motor makes one rotation at a first position among a plurality of second positions, each of the plurality of second positions being a motor position where a value of the motor current crosses zero; and
changing, after the magnetic disk starts rotating, a motor position where the counter electromotive voltage is measured every time the spindle motor makes one rotation from the first position to a set third position.

9. The method according to claim 8, wherein
the motor driver is capable of operating in any operation mode of a first mode in which the counter electromotive voltage is measured only at one of the plurality of second positions and a second mode in which the counter electromotive voltage is measured at all of the plurality of second positions, and
after the magnetic disk starts rotating, the motor driver transitions from the second mode to the first mode and measures the counter electromotive voltage only at the third position.

10. The method according to claim 9, further comprising reading servo information by a magnetic head,
wherein the magnetic disk device further includes the magnetic head,
the servo information is recorded in the magnetic disk, and
the motor driver transitions from the second mode to the first mode at a timing based on the servo information read by the magnetic head.

11. The method according to claim 8, further comprising:
executing control to learn repeatable run-out (RRO) and write a learned value of the RRO to the magnetic disk; and
setting a fourth position as the third position,
wherein the motor driver measures the counter electromotive voltage at the fourth position during the learning of the RRO.

12. The method according to claim 11, further comprising storing a positional relationship between a reference position based on servo information and the fourth position,
wherein the magnetic disk device further includes a magnetic head, and
the servo information is recorded in the magnetic disk.

13. The method according to claim 8, wherein
the first position is, among the plurality of second positions, a second position depending on a position of the spindle motor at a time of start-up of the magnetic disk device.

* * * * *